Figure 1:
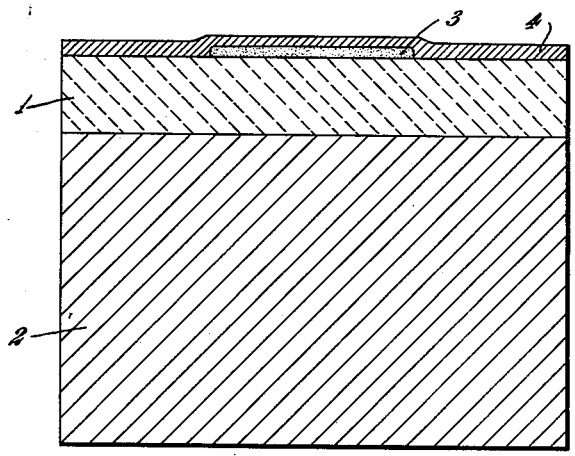

July 1, 1952 H. J. A. DE GOEIJ ET AL 2,602,025
PROCESS OF APPLYING CONTRASTING MARKS ON
SURFACES, PARTICULARLY THOSE OF PLASTICS
Filed April 7, 1950

INVENTORS
HENRICUS JOHANNES ANTONIUS DE GOEIJ AND
PIETER STALS
BY
AGENTS

Patented July 1, 1952

2,602,025

UNITED STATES PATENT OFFICE 2,602,025

PROCESS OF APPLYING CONTRASTING MARKS ON SURFACES, PARTICULARLY THOSE OF PLASTICS

Henricus Johannes Antonius de Goeij, Overveen, and Pieter Stals, Haarlem, Netherlands, assignors to N. V. Exploitatie Maatschappij "Quod Bonum," Amsterdam, Netherlands, a corporation of the Netherlands Application April 7, 1950, Serial No. 154,532
In the Netherlands November 11, 1949

4 Claims. (Cl. 41—26)

The invention relates to a process of applying, by means of a coloring material (paint, a lacquer or a printing ink) contrasting marks on a surface of a hydrophobic material which process consists in providing on the said surface by a photo-mechanical process a hydrophilic image, applying on the entire surface including the hydrophilic image a uniform layer of a paint, lacquer or a printing ink, which layer when dry will adhere very strongly to the original surface, but not to the hydrophilic image, and treating the surface when dry with a polishing or scouring agent, in order to remove the layer of paint, lacquer or printing ink from the parts of the surface covered by the image.

As a material for the surfaces that are to be provided with the marks, e. g. drawing, symbols or the like, I generally use a hydrophobic material more particularly a plastic, e. g. a polymethacrylate or polyvinyl chloride, resin. The paint, lacquer or printing ink should adhere strongly to the said surface, which will e. g. be the case, if a substance identical with, or kindred to the material of the support is used as a binding agent for the paint, lacquer or printing ink.

If the surface consists of a polymethacrylate or polyvinyl chloride resin excellent results will be obtained, for instance, if the binding agent of the paint is also polymethacrylate or polyvinyl chloride. Very favorable results are also obtained by adding to the paint, lacquer or printing ink a solvent in which the material of the surface, e. g. the plastic will swell.

A lacquer, paint or printing ink of this kind will not adhere to the hydrophilic image, that may have been obtained e. g. by copying a negative or a diapositive on a layer of bichromate-gum arabic. If the surface is treated, after drying, with a suitable polishing or scouring agent, e. g. white triple, or a polishing paste, the thin layer which covers the image will be easily removed. This will be particularly the case, when the scouring agent is mixed with a liquid in which the image will swell, particularly water. During the scouring treatment small cracks will soon appear in the layer covering the image, and the water will penetrate through said cracks. The hydrophilic material of the image will then begin to swell, which will greatly facilitate the removal of the layer of lacquer. The swollen hydrophilic material of the image will also be easily removed by the scouring agent.

In the places where there is no image the colored layer will adhere firmly to the original surface, so that it would only be possible to remove the same by a very protracted scouring treatment.

It is of importance that only a thin layer of lacquer or paint be applied so that it will quickly disappear from the image during the scouring or polishing treatment, without any appreciable damage being done to the layer that is located above the original surface.

The marks applied in this manner are very stable, while their outlines are much sharper than those obtained in prior methods by the application of loose stencils (as e. g. in the so-called "screen printing" process) or by relief printing or offset printing.

According to the invention one may produce dark marks on a light, e. g. a bright or opal white ground, as well as the reverse. One may also apply fluorescent marks by using a fluorescent support and covering the same with a non-fluorescent layer of paint, or by applying a fluorescent covering layer upon a non-fluorescent support.

The invention will hereinafter be further explained with reference to the drawing.

In Fig. 1 of the drawing the reference numeral 1 represents a layer of opaque white plastic consisting e. g. of pigmented polyvinyl chloride, which layer has been glued to a layer 2 of some other kind of plastic. On the layer 1 there is located a hydrophilic photo-mechanical mask 3, obtained e. g. by covering the surface of the layer 1 with a thin coating of bichromate-gum arabic, and developing and drying the same after exposure through a negative or a diapositive.

After drying, the whole surface including the mask 3 is coated with a thin, opaque ( e. g. black) layer of lacquer 4 containing polymethacrylate as a binding agent. By using a suitable solvent for the binding agent of the said layer of lacquer it will be possible to obtain a very good adherence of the dried layer of lacquer to the plastic 1, whereas the said layer of lacquer will not adhere to the mask.

Figure 2:
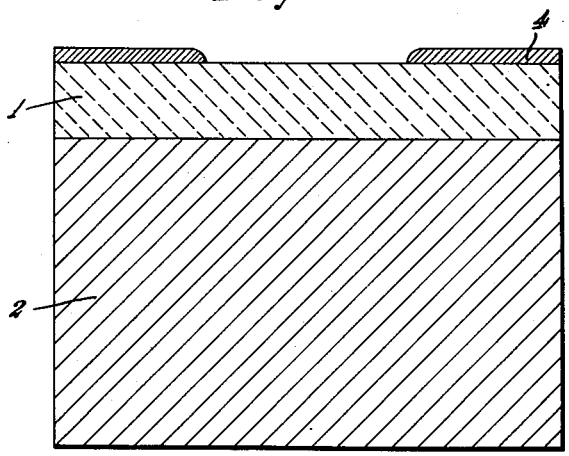

Fig. 2 shows the situation after the layer of lacquer 4 has been treated with an aqueous suspension of a suitable fine polishing or scouring agent.

The layer of lacquer above the mask 3 as well as the mask itself have been completely removed by the aqueous polishing or scouring paste.

On the spot where the mask 3 was originally located, the white surface 1 of the plastic will now be visible, whereas the remaining portions of the said white surface are covered by the layer of lacquer 4. The white and the black portions are very sharply outlined, the white portion being located on a slightly lower level than the black one.

We claim:

1. A method of providing contrasting marks on the surface of a hydrophobic material, which comprises producing a hydrophilic image of the mark on the surface by a photomechanical copying process, coating the whole surface including the hydrophilic image with a uniform layer of a coloring material containing a non aqueous vehicle, the said coloring material having strong adhering properties to the hydrophobic material but not to the hydrophilic material of the image, drying the coating and treating the surface with a suitable abrasive agent, so as to remove the coating only on those parts of the surface covered with the hydrophilic image.

2. A method according to claim 1, in which the hydrophobic material is a plastic.

3. A method of providing contrasting marks on the surface of a hydrophobic material, which comprises producing a hydrophylic image of the mark on the surface by a photomechanical copying process, coating the whole surface including the hydrophilic image with a uniform layer of a coloring material containing a non aqueous vehicle, the said coloring material having strong adhering properties to the hydrophobic material but not to the hydrophilic material of the image, drying the coating and treating the surface with an aqueous abrasive agent so as to remove both the coating present on those parts of the surface covered with the hydrophilic image and the hydrophilic image itself.

4. A method according to claim 1 in which the vehicle of the coloring material is a swelling agent for the hydrophobic material.

HENRICUS JOHANNES
      ANTONIUS DE GOEIJ.
PIETER STALS.

REFERENCES CITED

The following references are of record in the file of this patent:

UNITED STATES PATENTS

| Number | Name | Date |
|---|---|---|
| 2,210,879 | Cahoon | Aug. 13, 1940 |